March 7, 1961
R. J. GOLDRICK ET AL
2,973,919
APPARATUS FOR STOWING AND PREPARING FOR OVERBOARDING
A SUBMARINE CABLE INCLUDING RIGID
INSTRUMENTALITY HOUSINGS
Filed June 4, 1958
4 Sheets-Sheet 1

INVENTORS:
R. J. GOLDRICK
F. W. KINSMAN
L. LINE

BY John C. Morris
ATTORNEY

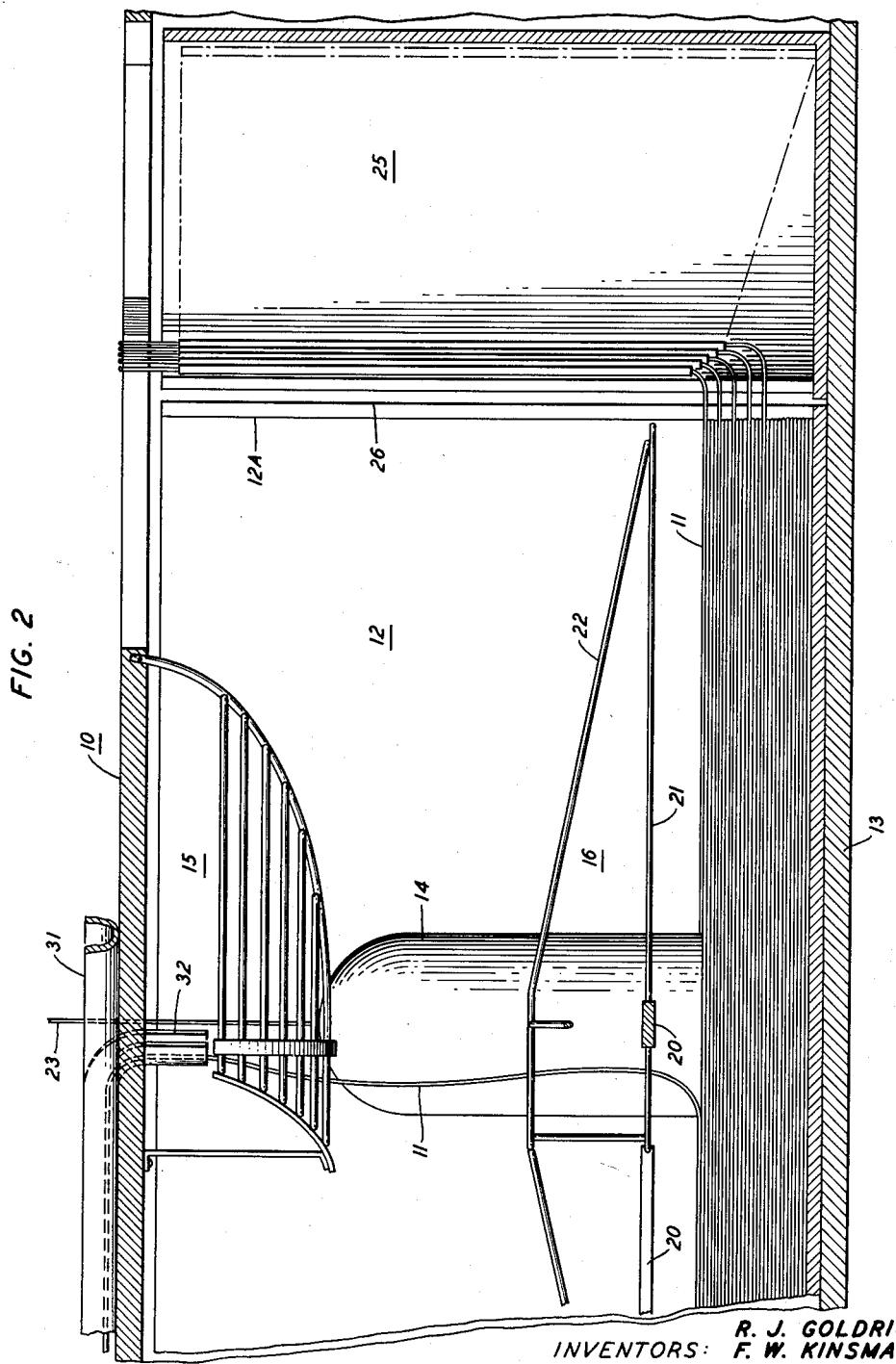

March 7, 1961 R. J. GOLDRICK ET AL 2,973,919
APPARATUS FOR STOWING AND PREPARING FOR OVERBOARDING
A SUBMARINE CABLE INCLUDING RIGID
INSTRUMENTALITY HOUSINGS
Filed June 4, 1958 4 Sheets-Sheet 3
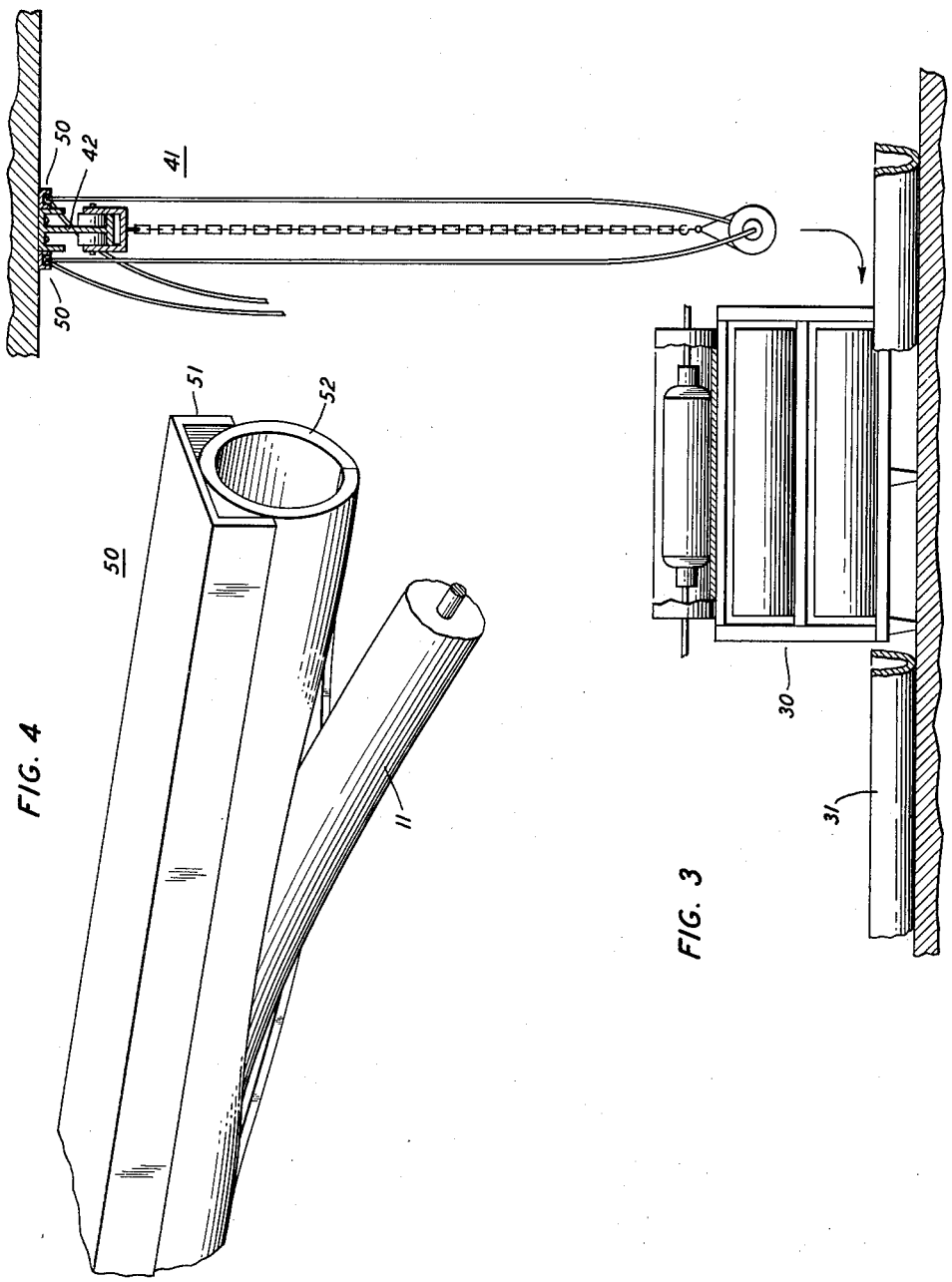
INVENTORS: R. J. GOLDRICK
F. W. KINSMAN
L. LINE
BY John C. Morris
ATTORNEY March 7, 1961

R. J. GOLDRICK ET AL 2,973,919

APPARATUS FOR STOWING AND PREPARING FOR OVERBOARDING
A SUBMARINE CABLE INCLUDING RIGID
INSTRUMENTALITY HOUSINGS

Filed June 4, 1958

INVENTORS: R. J. GOLDRICK
F. W. KINSMAN
L. LINE

BY John C Morris

ATTORNEY 2,973,919

APPARATUS FOR STOWING AND PREPARING FOR OVERBOARDING A SUBMARINE CABLE INCLUDING RIGID INSTRUMENTALITY HOUSINGS

Richard J. Goldrick, Ridgewood, N.J., and Frank W. Kinsman, Penfield, and Leif Line, Westerleigh, N.Y., assignors to Bell Telephone Laboratories, Incorporated, New York, N.Y., a corporation of New York Filed June 4, 1958, Ser. No. 739,891

12 Claims. (Cl. 242—128)

This invention relates to the handling of ocean cable that includes rigid instrumentality housings at spaced intervals. More particularly, the invention is concerned with means for stowing such cable and housings on a cable laying ship and feeding the cable continuously to a cable engine without appreciably slowing the ship during the laying, recovering or other handling of the cable and the rigid housings. Where the term "cable laying" is used in the following description and discussion of this invention, "cable recovering" or other like handling are intended to be included.

The insertion at intervals in an ocean or undersea cable of housings for electrical instrumentalities has presented many problems. One problem involves the handling of such cable with conventional cable laying and recovering equipment. This problem has been solved in one way by enclosing an array of electrical devices, such as those comprising a repeater, in a relatively long, flexible housing of slightly greater diameter than that of the cable. Cable so constructed has been handled with conventional cable gear.

The transmission requirements of repeaters, equalizers, and other appurtenances of a long telephone cable point to the desirability of a more compact arrangement of the elements of such devices. This has been accomplished by the use of relatively bulky, rigid housings several feet long and of the order of ten or more times the cable diameter. Heretofore these rather massive rigid housings have required that the cable ship be stopped during their laying. This has required various units of auxiliary gear and a certain amount of "manhandling."

As a matter of convenience in describing this invention, it is proposed to designate the rigid housings as "repeater housings," "rigid repeaters" or just as "repeaters," since repeaters or amplifiers are the chief "instrumentalities" contained in such housings. This should not, however, be taken as in any sense limiting the invention to repeaters because equalizers or other necessary instrumentalities may also be contained in some of the rigid housings. The problems herein considered are due to the rigidity of the housings and to their substantially greater diameter than that of the cable, for example, an approximately ten to one ratio, and to the need for maintaining a minimum bending radius of the cable.

Accordingly, an object of this invention is to facilitate the shipboard handling and stowing of undersea cable which includes rigid repeaters and which must not be bent in a curve having less than a given minimum radius.

A more specific object is to so stow and handle cable including rigid repeaters that cable laying or other handling may continue without interruption even during overboarding of such repeaters.

Another specific is to provide mechanisms that at all times assure that the cable be not bent to a curve of less than a preassigned minimum radius.

Another particular object, subsidiary to the foregoing objects, is to facilitate the continuous handling of such cable bights as may tend to form, so that fouling or kinking of the cable is avoided.

An exemplary embodiment of the apparatus features of this invention comprises an assemblage on a cable ship comprising a main cable stowage tank, an auxiliary cable stowage tank, a repeater stowage rack, and a trough, or cable and repeater guide or chute, leading from the stowage facilities to a cable engine. This equipment is characterized by slots for communication between various parts thereof, which slots have no gates or other barring means, thus allowing free passage of the cable at all times. The various slots, while allowing free passage of cable, are so constructed and arranged that a lateral cable movement, that is, one having a component perpendicular to the prescribed cable path, is at all times constrained to a sufficiently small amplitude to prevent undue whipping or other motions potentially harmful to the cable, to the handling gear or to the crew.

The main tank has a central cone, a slotted bell-mouth above the cone, and a slotted crinoline around the cone. Mating slots or a passageway connect the main and the auxiliary cable tanks. Appropriate slotting of the deck affords cable passage between the stowage facilities and into the guiding trough. Automatically releasable retainers for temporarily constraining the cable are located in the auxiliary cable tank, adjacent to the guiding trough, and in any other zones where support or control is necessary and possible by such means. The repeater stowage rack may be in the auxiliary tank or on the deck above the tanks. The relation of the various parts of the equipment will be better appreciated from the ensuing particular description of its elements and of its use.

In preparation for a cable laying trip, the cable is fed into the main tank by bringing it down through the bellmouth and within and under the crinoline, and is coiled in successive layers or flakes around the cone. When a repeater is encountered, the cable is passed through the bellmouth and crinoline slots into the auxiliary tank and up to the deck through an appropriate slot. The repeater is placed on its stowage rack and the trailing cable brought back over a reverse path through the auxiliary tank to the main tank by way of the various slots. It may be here noted that the portion of the cable just designated as "trailing" will be the "leading" portion during cable laying. In order to avoid ambiguity in the designation of those portions of the cable immediately adjacent to a repeater housing, it appears desirable to refer to them as "inboard" and "outboard" leads or portions. Such designations are independent of any instant direction of cable or repeater motion relating only to orientation with respect to the ship and the sea.

After the placing of the repeater and its attendant cable portions, coiling of the cable in the main tank continues. The two portions of the cable in the auxiliary tank are inserted in temporary retainers to avoid kinking or snarling. Such temporary retainers as are required to restrain those portions of the cable adjacent to the rack may also be employed. This procedure continues until an "ocean block," comprising say two hundred miles of cable and twenty repeaters, is stowed. The repeaters are racked in the reverse order to that of their laying. Additional tanks, racks, and necessary appurtenances may be provided to increase the cable stowage capacity of the ship. Although in the example just given the repeaters have been assumed to have a ten-mile spacing, this might be as much as twenty or more miles under some circumstances.

After stowage is completed and the ship has proceeded to the laying zone or cable grounds, the last stowed end of the cable is led via the trough to and through the cable engine and, thence, overboard under the control and guidance of suitable means. Prior to the time of the overboarding of the repeater, the first repeater to be laid is removed from the rack and placed in the guiding trough in a ready position. The inboard portion of the cable is also removed from the auxiliary tank and is inserted in temporary cable retainers so located as to dispose this portion of the cable in a relatively wide loop having no radius less than the required minimum. Advantageously, the retainers are secured in positions above the trough. The repeater advancing to the engine will pull the cable from the temporary retainers, through the various slots back to the bellmouth and crinoline, and laying will continue as before. If the repeater stowage rack is in the auxiliary tank, much the same procedure is followed, the repeater being raised from the tank to the deck for disposition in the trough.

The amount of cable between a given repeater housing and the auxiliary cable tank will be different for each repeater, depending upon the position of that repeater on the stowage rack and upon the relative positions of the auxiliary tank, stowage rack, and the trough. Thus, handling of those portions of the cable adjacent to the repeater will vary from time to time. In any case, whatever slack there may be in the inboard or outboard repeater leads, it should be controlled. A portion of the inboard lead will ordinarily be temporarily secured in a suitable retainer located above the deck in the vicinity of the auxiliary tank, the rack, and the adjacent portion of the trough. Thus, the cable will always be maintained in relatively straight sections or in wide, open loops to avoid kinking or snarling when the repeater advances.

A general feature of this invention resides in the combination of a plurality of shipboard cable and rigid repeater stowing and controlling facilities with appurtenant intercommunicating passages so constructed and arranged that stowed cable and included repeaters may be expeditiously and continuously overboarded at normal cable laying speeds.

Another feature of this invention, in a sense particular, but general in that it permeates the whole organization of devices, lies in the provision of means for controlling cable bights and incipient cable bights at all times and in a manner permitting continuous laying of the cable and its included rigid repeaters.

A further feature of the invention involves the appropriate location and use of cable retainers capable of constraining a relatively quiescent cable but automatically releasable at suitable stages of cable movement during cable laying.

An additional feature of this invention resides in means for accelerating a stationary, rigid housing to cable laying speed as a result of the various controlled motions of the cable accompanying the paying-out operation.

Other and further objects and features of this invention will appear more fully and clearly from the ensuing description of illustrative embodiments of the invention in connection with the appended drawings in which:

Fig. 2 is a section on line 2—2, Fig. 1;

Fig. 3 is a fractional view in elevation of repeater stowage means, a repeater handling hoist, and a portion of a cable and repeater guiding trough;

Fig. 4 is a perspective view of an automatically releasable cable retainer; and

Figure 1:
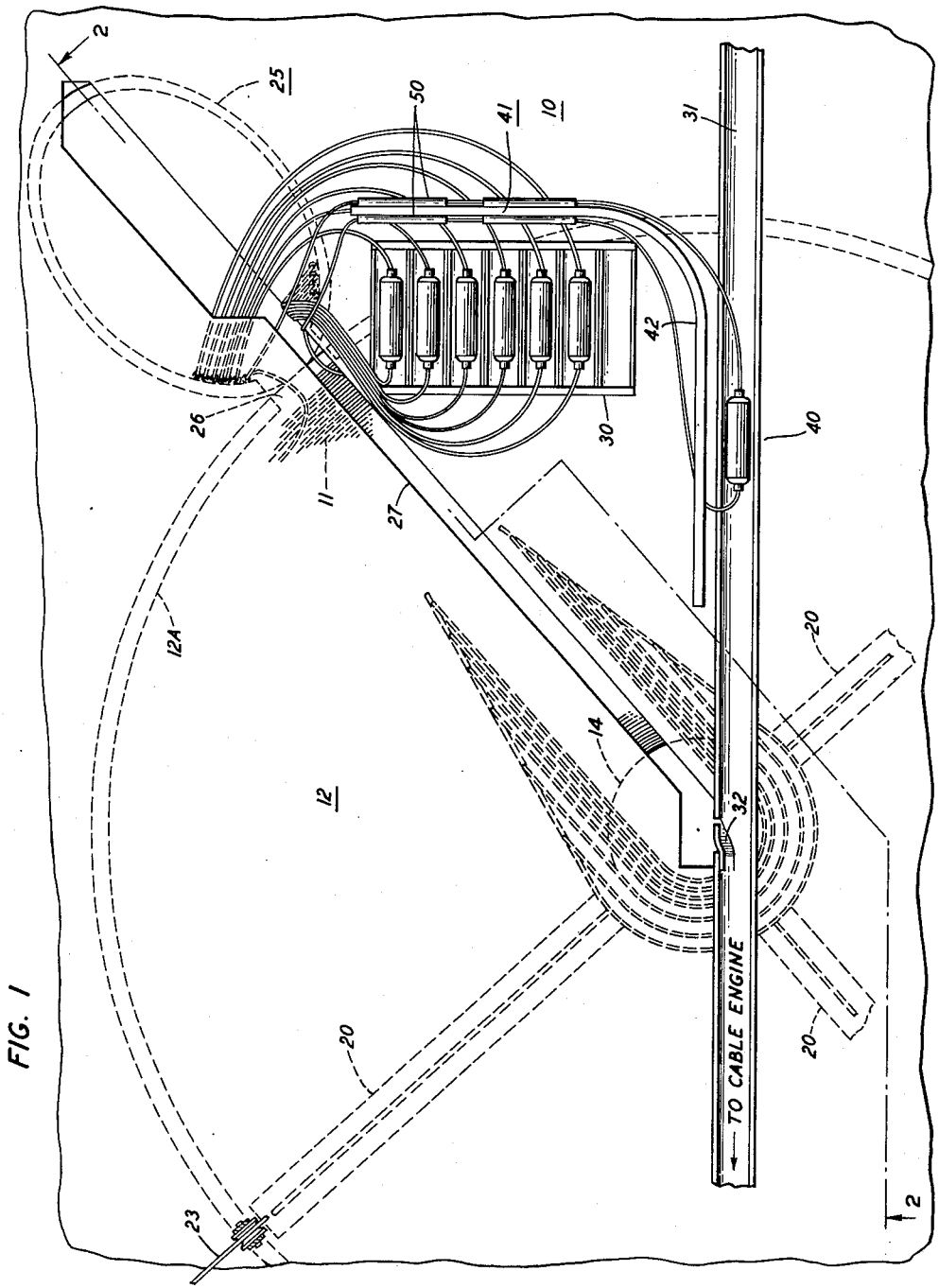
Fig. 1 is a plan view of cable stowage facilities pertinent to an illustrative embodiment of this invention.

The apparatus illustrated in Figs. 1 and 2 may be located generally amidships with elements of the assembly both above and below an upper deck 10. The cable 11 is coiled in flakes or layers in a main stowage tank 12 bounded by a cylindrical wall 12A and resting on a lower deck 13. Such a tank may be forty feet in diameter and from twenty to twenty-five feet or more in depth. In the center of the main stowage tank is a "cone" 14, which may be generally cylindrical with a hemispherical top, as shown, or of other suitable configuration such as frusto-conical. The diameter of this cone may be about six to ten feet.

Above the cone 14 and generally coaxially therewith is a bellmouth 15, which may be supported from the underside of the deck 10. Although the bellmouth illustrated is a skeletal structure of rods and bars, formed plates or the like may be used for this structure, if desired. The portion of the bellmouth coaxial with the cone is roughly of toroidal configuration with its walls extending in generally parallel relation on one side to form a cable slot. The shape of the bellmouth is such as to never constrain the cable to a curve of less than the required minimum radius.

Figure 5:
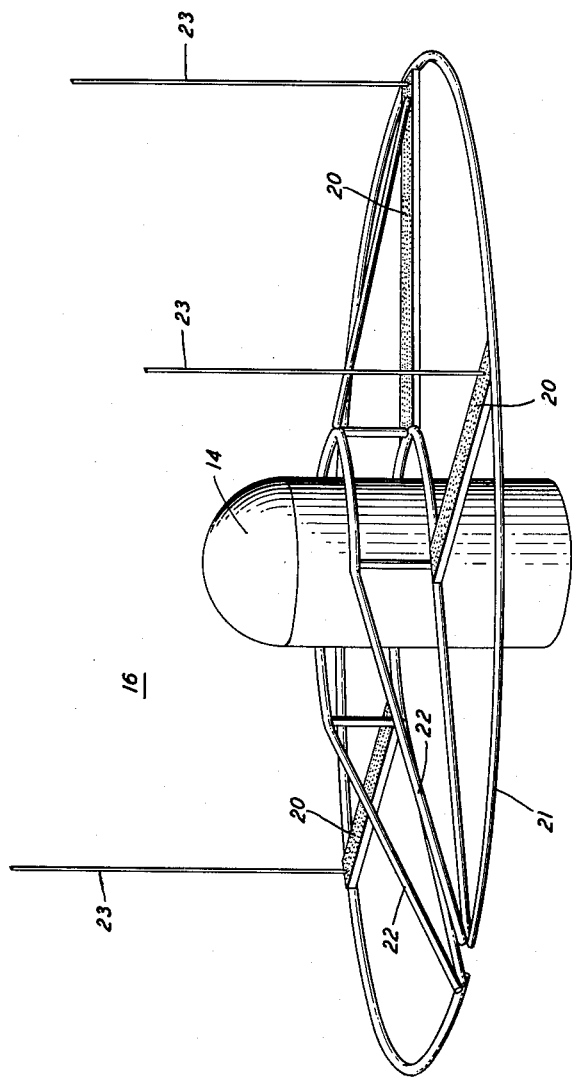
Fig. 5 is a perspective view of a crinoline for the main cable stowage tank.

Suspended around the cone 14 is a crinoline 16 for constraining the cable during payout. As shown in Figs. 1, 2 and 5, particularly the latter, the crinoline may comprise radial beams 20, for example three, spaced ninety degrees apart, a peripheral, curved rod member 21, slot defining rods 22, and suitable braces and struts to form a relatively flat, conical structure. The crinoline may also comprise radial arms suitably attached to its central portion without a peripheral member. The crinoline is adjustably supported from the ship structure, for example the deck 10, by chains or cables. A portion of one crinoline suspension is illustrated in Fig. 1 at 23.

An auxiliary cable tank 25 is located at one side of the main tank 12 and is connected with said main tank via a slot or passage 26. Although shown in direct communication by slots in their walls, these tanks may be spaced apart with a walled passage between them. A portion of the deck 10 above the cable tanks is slotted for cable passage. Such a deck slot extending from the center of the main tank across the auxiliary tank is shown at 27 in Fig. 1.

A repeater stowage rack 30 is located on the deck 10 adjacent the juncture of the cable tanks. Additional racks, as required by the number of repeaters needed for the cable stowed in the main tank, may be conveniently placed in this area.

A cable and repeater guiding trough 31 extends longitudinally along the deck 10 adjacent to the stowage means. The portion of the trough 31 near the top of the cone 14 is provided with an auxiliary cable guiding ramp or passage 32 for conducting cable to and from the tank. The cable trough 31 may have any of several different cross sections, for example, round bottom with vertical or outwardly sloping sidewalls, or generally rectangular. The criterion is a shape that will reasonably constrain a repeater from sidewise motion but allow free passage of it and the cable along the trough with minimal interference. The trough extends beyond the cable stowage means in both directions to other stowage facilities or to cable engines. The illustration in Figs. 1 and 2 supposes a cable engine aft of the stowage means for over-the-stern laying and other stowage gear forward of that shown. Forward cable engines for laying or recovering cable at the bow are also contemplated in the present assembly.

Each repeater, prior to its launching, must be placed in a ready position in the trough 31, for example, at 40 in Fig. 1. A convenient means for effecting transfer from the stowage rack to the trough is a hoist such as that diagrammatically shown at 41 in Fig. 3. A track 42 may be secured to the overhead above the deck 10 to guide the hoist from adjacent the repeater rack to the trough.

In order to handle bights in the inboard and outboard portions of the cable adjacent to a repeater, temporary restraining means, such as the automatically releasable cable retainer 50, are provided at suitable locations. Two of these mounted on either side of the hoist track 42 are shown in Fig. 3.

One kind of cable retainer is shown in detail in Fig. 4. In this device a channel member 51 advantageously of metal supports a split cylindrical gripper 52 of resilient material. A piece of "rubber" hose split along one side might be suitable. The cable 11 is forced into the gripper by suitable means and is retained until pulled free by movement of the cable away from the gripping zone. A sufficient number of temporary cable retainers is mounted on the inner walls of the auxiliary tank 25 to accommodate all of the cables passing therethrough. These bight handlers or retainers will ordinarily be used in pairs, that is, one for the inboard portion and the other for the outboard portion of the cable appurtenant to a given repeater. Under some conditions, depending upon the relative positions of the various elements of the cable handling gear, it may be desirable to transfer each pair of leads in turn from their temporary retainers to "launching" or "ready" bight handling devices located in a suitable position, for example, adjacent the exit zone from the auxiliary tank.

As illustrated in Fig. 2, the cable being payed out passes from the top flake or layer in the main tank, up between the crinoline 16 and the cone 14, through the bellmouth 15, over the ramp 32 into the trough 31, and then on to the cable engine. During the laying of the intermediate cable, the repeater next to be launched is placed in the ready position at 40 in the trough 31 at Fig. 1. The inboard and outward portions of cable adjacent to the repeater are secured in the overhead retainers 50 if necessary. These portions may run into the auxiliary tank and pass through the slot 26 into the main tank. If there is a walled passage between tanks, suitable cable retainers or shelves therein will support the cable.

It may be well at this point to note that the term cable "bight" as herein used refers to any portion of cable which is of sufficient length and is sufficiently unconstrained to form a tight loop or a kink if not properly controlled. For example, some portions of the cable may be stowed so as to form a loop or true "bight," whereas other portions, such as the inboard and outboard leads of a repeater, may have sufficient slack to form a bight if not properly constrained.

Since the racked repeaters are at different distances from the ready position 40 of Fig. 1, there will be different lengths of slack cable at different stages of operation. For example, it has been noted that both the inboard and outboard portions of cable adjacent to a ready repeater may be constrained by the overhead retainers 50. It may be, however, that one or both of these cable portions are short enough to require no restraining means above the deck. The two cable portions from a given repeater merge into the coiled cable in the main tank at a zone dictated by the various dimensions of the stowage means and the spacing of the repeaters. This may be at the outside turn or anywhere from there in to the cone. For merger with turns other than the outer turn, the cable will pass across the flake or layer in a generally radial direction. The radial portion of cable and the underlying flake may be protected from the effects of excess pressure by means of suitable dunnage, for example, "feather-edge" strips of wood.

In order that the cable may pass freely just prior to and immediately after the launching of a repeater, the slots in the crinoline, bellmouth, tanks, and deck should be in essential alignment with each other; that is, they should all conform generally to the same vertical plane. All slots should be of sufficient width and smoothness to allow free passage of the cable at all times. On the other hand, each slot should be sufficiently confining to maintain cable control at all times during its passage. In other words, all boundaries of the total cable path must be located with respect to the required path to oppose cable movements having a component perpendicular to the cable axis without appreciably constraining movement in the direction of this axis. Any change in direction must be over a path having a preselected minimum radius. For 1.25 inch armorless cable of the type herein contemplated, this minimum appears to be three feet. The minimum, of course, may vary with the type of cable used.

Returning to the cable operation, as the last turn of cable ahead of the repeater is reached, that is, the outboard lead, the cable is pulled up through the slots, from the temporary retainers, and out of the auxiliary tank until it straightens out in the trough, at which time the repeater is accelerated by the cable. The inboard portion of the cable pulls clear of the overhead retainers, out of the auxiliary tank, and through the slots until it is again passing out through the bellmouth and the crinoline.

The purpose of the crinoline is to control that part of the cable leaving the flake and passing to the bellmouth. The crinoline is supported a short distance above the top flake by its adjustable suspensions. This distance is kept within reasonable bounds, as learned by experience, usually by occasional lowering of the crinoline as the height of the stowed cable is reduced. Automatic lowering means controlled by cable payout could be used if necessary or desirable.

Where several cable stowage tanks are used for one continuous laying operation, the cable bight between tanks is pulled up through appropriate slots until it is feeding from the next tank to be used.

Various different arrangements of the salient elements of the cable gear of this invention may be made within the sphere and scope thereof. For example, a repeater rack may be placed within the auxiliary tank. Such a rack would advantageously have one or more vertical rows of racking means clustered around the center portion of the auxiliary tank. With such an arrangement, the cable and repeater guiding trough might be oriented in parallel relation to the deck slot or vice versa.

In some cases it may be desirable to dispense with the auxiliary tank in an installation including deck stowage of repeaters. With such an arrangement, the inboard and outboard leads appurtenant to each repeater may be stowed in a magazine between the main cable tank and the repeater stowage rack. Such a magazine may be equipped with sidewall shelves and such temporary cable retainers as are required to support the cable.

Under some circumstances it may be undesirable to have deck slots, for example, in an existing cable ship re-equipped with the gear herein described. The inboard and outboard repeater leads could then be brought up the outside wall of the main cable tank and under the deck through an opening adjacent to the bellmouth, and thence to the stowage rack. The leads could then be carried across the deck to the repeater stowage rack which would ordinarily be as close to the main tank as possible. The inboard and outboard leads in an installation of the kind just described would require temporary cable retainers on the main tank wall and under the deck portion above this tank. Transfer to "ready" or "launching" retainers might be desirable in such cases. Also the bellmouth and crinoline could be made rotatable to bring their slots opposite to the inboard-outboard cable pair next to be withdrawn from the tank.

Other and further arrangements of the illustrated parts or equivalents thereof will occur to those interested in this type of operation.

What is claimed is:

1. Means for shipboard stowage and control of undersea cable including at intervals rigid repeaters, said means comprising a main cable stowage tank having wall portions defining a slot, a central cone in said tank, a bellmouth above said cone, a crinoline around said cone, said bellmouth and crinoline each having portions defining a slot; an auxiliary cable tank adjacent to said main tank and having portions defining a slot; a deck above said tanks, said deck having portions defining a slot extending between said tanks, all of said slots being in substantial alignment; a repeater stowage rack on said deck and adjacent the juncture of said tanks; and a repeater and cable guiding trough extending from adjacent said tanks and rack to other cable handling facilities.

2. Means for shipboard stowage and control of undersea cable including at intervals rigid repeaters, said means comprising a main cable stowage tank having a wall slot, and including a central cone, a bellmouth above the cone, and a crinoline around the cone, said bellmouth and crinoline each including a slot; an auxiliary cable tank adjacent to said main tank and having a slot in communication with the wall slot of the tank; a deck above said tanks, said deck having a slot extending between said tanks, all of said slots being in substantial alignment; a repeater stowage rack adjacent the juncture of said tanks; and a repeater and cable guiding trough extending from adjacent said tanks and rack to other cable and repeater handling means.

3. Means for shipboard stowage and handling of undersea cable having rigid repeaters therein, comprising a main cable stowage tank, an auxiliary cable tank, said tanks being located below a deck and having a narrow connecting passage between them; said main tank including a central cone, a side slotted bellmouth above said cone, a radially slotted crinoline around but spaced from said cone and suspended in the said tank, the slotted portions of the bellmouth and crinoline being in alignment with said passage; a repeater stowage rack on said deck in proximity to said tanks; and a cable and repeater guiding trough on said deck and extending from adjacent said tanks and rack to a cable engine, said deck being slotted from the bellmouth to and including the auxiliary tank.

4. Means for shipboard stowage and handling of undersea cable having rigid repeaters therein as in claim 3 and including automatically releasable cable constraining means for those portions of the cable between the main tank and the repeater stowage rack.

5. Means for shipboard stowage and handling of undersea cable having rigid repeaters therein as in claim 3 and including a cable guiding ramp extending from above the bellmouth to the cable and repeater guiding trough.

6. Means for shipboard stowage and control of undersea cable including rigid instrumentality housings, comprising a tank for stowing cable, said tank having a slotted wall portion open at its upper end; a centrally located, side slotted bellmouth adjacent the top of the tank, and a radially slotted crinoline in line vertically with and below the bellmouth, the slots of each in mutual alignment; a rack for stowing said instrumentality housings; means for temporarily constraining those portions of the cable extending between the cable tank and the racked housings; and a cable and instrumentality housing guiding means extending between the stowage means and other cable handling and controlling means.

7. Means for stowing a cable with included rigid repeaters and for guiding said cable and repeaters to a cable engine, said means comprising a main cable stowage tank having an open topped sidewall slot, a side slotted annular bellmouth at the upper end of the tank, and a radially slotted crinoline below the bellmouth, the slots being in alignment; a repeater racking means outside of said main tank and including temporary, automatically releasable cable supports; an auxiliary cable tank between the repeater racking means and the main tank, said auxiliary tank having a sidewall slot mating with the main tank slot; and a cable and repeater guiding trough leading from adjacent the cable tanks and repeater racking means to a cable engine.

8. Means for stowing a cable with included rigid repeaters and for guiding said cable and repeaters to a cable engine, said means comprising a cable stowage tank having a wall slot and including a side slotted annular bellmouth at the upper central part of the tank, and a radially slotted crinoline below the bellmouth, the slots being in substantial alignment; a repeater rack; means defining a path for cable between the tank wall slot and said rack, automatically releasable cable supports along the path for cable extending between the cable tank and said rack; and a cable and repeater guiding trough adjacent to the cable tank and repeater rack.

9. A shipboard cable and rigid repeater stowage assembly comprising a main cable tank having a bellmouth including a cable slot, and a crinoline also including a cable slot, said bellmouth and crinoline centrally located in the tank with the bellmouth above the crinoline and near the top of the tank, an auxiliary cable tank having a cable passage to the main tank, said slots being in substantial alignment with said passage, and a repeater stowage rack outside of the main cable tank but having communication with said main tank by way of the auxiliary tank and said passage.

10. An assembly as in claim 9 wherein the repeater stowage rack is within the auxiliary cable tank.

11. An assembly as in claim 9 in which the repeater stowage rack is on a deck above the cable stowage tanks.

12. An assembly as in claim 9 in which the repeater stowage rack and the auxiliary tank are equipped with automatically releasable cable constraining devices.

References Cited in the file of this patent

UNITED STATES PATENTS

| 1,703,777 | Pernot | Feb. 26, 1929 |

FOREIGN PATENTS

| 1,091 | Great Britain | of 1855 |
| 2,287 | Great Britain | of 1857 |

OTHER REFERENCES

"Submarine Cable Laying and Repairing," by Wilkinson, published in 1896 in London. (Pages 101–104 relied on.)

"Submarine Telegraphs," by Bright, published in 1898 in London. (Pages 18 and 19 relied on.)